United States Patent
Vohra et al.

(10) Patent No.: US 10,313,283 B2
(45) Date of Patent: Jun. 4, 2019

(54) OPTIMIZING E-MAIL FOR MOBILE DEVICES

(71) Applicant: Microsoft Technology Licensing, LLC, Redmond, WA (US)

(72) Inventors: Rahul Vohra, San Francisco, CA (US); Martin Alexander Kleppmann, Kingston upon Thames (GB); Lee Mallabone, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/194,136

(22) Filed: Feb. 28, 2014

(65) Prior Publication Data

US 2015/0046547 A1    Feb. 12, 2015

Related U.S. Application Data

(60) Provisional application No. 61/863,170, filed on Aug. 7, 2013.

(51) Int. Cl.
*H04L 12/58* (2006.01)

(52) U.S. Cl.
CPC .............. *H04L 51/06* (2013.01); *H04L 51/38* (2013.01)

(58) Field of Classification Search
CPC ............................ G06F 3/04842; H04L 12/58
USPC ........................................ 709/206; 715/753
See application file for complete search history.

(56) References Cited

U.S. PATENT DOCUMENTS

| 8,176,416 B1* | 5/2012 | Williams ............ G06F 17/2247 715/243 |
| 8,224,308 B1* | 7/2012 | Gavrylyako .......... H04L 67/306 455/405 |
| 2006/0101334 A1* | 5/2006 | Liao ..................... G06F 17/2264 715/205 |
| 2007/0198340 A1* | 8/2007 | Lucovsky ......... G06F 17/30864 705/14.64 |
| 2008/0127289 A1* | 5/2008 | Julia .................. H04N 7/17318 725/109 |
| 2008/0189622 A1* | 8/2008 | Sanchez ................. G06Q 10/06 715/752 |
| 2008/0313659 A1* | 12/2008 | Eide .................... G06F 17/2247 719/328 |
| 2012/0278700 A1* | 11/2012 | Sullivan ................ G06F 17/218 715/235 |

(Continued)

*Primary Examiner* — Nicholas R Taylor
*Assistant Examiner* — Meng Vang
(74) *Attorney, Agent, or Firm* — Schwegman Lundberg & Woessner, P.A.

(57) ABSTRACT

Methods and systems of optimizing e-mail for mobile devices are described. In some embodiments, an e-mail message is caused to be displayed within an e-mail client on a mobile device. The e-mail message comprises a selectable link corresponding to a website action that can be performed on a website. A user on the mobile device is enabled to cause a performance of an e-mail action corresponding to the website action via the e-mail client without navigating to the website, such as via a new e-mail message generated within the e-mail client. A mobile link configured to cause the performance of the action via the e-mail client can be included in the e-mail message. A CSS pseudo-element can be included in CSS rules for the e-mail message. The CSS pseudo-element can be configured to generate mobile content associated with the mobile link.

16 Claims, 12 Drawing Sheets

(56) References Cited

U.S. PATENT DOCUMENTS

| | | | | |
|---|---|---|---|---|
| 2013/0124662 A1* | 5/2013 | Yamamoto | ............. | G06F 13/00 |
| | | | | 709/206 |
| 2013/0290079 A1* | 10/2013 | Chavan | ............. | G06Q 30/0251 |
| | | | | 705/14.4 |
| 2014/0278949 A1* | 9/2014 | Maxson | ............. | G06Q 30/0251 |
| | | | | 705/14.49 |
| 2014/0297759 A1* | 10/2014 | Mody | ..................... | H04L 51/08 |
| | | | | 709/206 |

* cited by examiner

```
<a href="http://www.linkedin.com/contacts/email/redirect/
?id=5745436&profile_id=23510&type=&url=http%3A%2F%2Fwww.linkedin.co
m%2Fcontacts%2Fdaily%2F%3Ftype%3Djob_change%26id%3D52697228"
class="desktop">
    Congratulate
</a>

<a
href="mailto:nik@partender.com?subject=Congrats&body=Hi%20Nikhil%2C
%0A%0ACongrats%20on%20the%20new%20gig!%20Hope%20you%27re%
20doing%20well.%0A%0ARahul" class="mobile">
</a>
```

FIG. 3A

```
<style>
@media only screen
and (max-device-width: 480px) {      ⎫ 352
  a.mobile{                          ⎬ 354
    display: block !important;
  }
  a.mobile:after {                   ⎬ 356
    content: "Congratulate";
  }
  a.desktop {                        ⎬ 358
    display: none !important;
  }
}
</style>
```

```
<a href="http://www.linkedin.com/contacts/email/redirect/
?id=5745436&profile_id=23510&type=&url=http%3A%2F%2Fwww.linkedin.co
m%2Fcontacts%2Fdaily%2F%3Ftype%3Djob_change%26id%3D52697228"
class="desktop" yahoofix="true">
Congratulate  ← 412
</a>  ← 314
← 316
<a
href="mailto:nik@partender.com?subject=Congrats&body=Hi%20Nikhil%2C
%0A%0ACongrats%20on%20the%20new%20gig!%20Hope%20you%27re%
20doing%20well.%0A%0ARahul" class="mobile" yahoofix="true">  ← 414
</a>  ← 318
```

```
<style>
@media only screen
and (max-device-width: 480px) {      ⎱ 352
  a[yahoofix=true].mobile{            ⎱ 354
454 → display: block !important;
  }
  a[yahoofix=true].mobile:after {     ⎱ 356
456 → content: "Congratulate";
  }
  a[yahoofix=true].desktop {          ⎱ 358
458 → display: none !important;
  }
}
</style>
```

```
<a href="#" id="like"></a>
<div id="liked">You like this</div>
```

FIG. 5A

```
media only screen and (max-device-width: 480px) {
div#liked { display: none; }
a#like:after { content: "Like"; }
a#like:hover:after { content: ""; }
a#like:hover ~ div#liked { display: block; }
a#like:hover ~ div#liked:after { content: url('https://www.linkedin.com/like.gif?token=68656c6c6f776f726c64'); }
}
```

OPTIMIZING E-MAIL FOR MOBILE DEVICES

CROSS-REFERENCE TO RELATED APPLICATIONS

This application claims priority to U.S. Provisional Application No. 61/863,170, filed on Aug. 7, 2013, and entitled, "OPTIMIZING THE FUNCTIONALITY OF A MOBILE BROWSER," which is hereby incorporated by reference in its entirety as if set forth herein.

TECHNICAL FIELD

The present application relates generally to mobile devices. More specifically, the present disclosure relates to methods, systems and computer program products for optimizing e-mail for mobile devices.

BACKGROUND

A mobile operating system (mobile OS) supports various types of computing resources, such as mobile applications (mobile "apps"), mobile clients, mobile browsers, and so on. At times, one resource may provide a better experience than another resource.

BRIEF DESCRIPTION OF THE DRAWINGS

Some embodiments of the present disclosure are illustrated by way of example and not limitation in the figures of the accompanying drawings, in which like reference numbers indicate similar elements, and in which:

FIG. 3A illustrates source code of an e-mail message, in accordance with some embodiments;

FIG. 3B illustrates a style sheet for an e-mail message, in accordance with some embodiments;

FIG. 4A illustrates source code of an e-mail message, in accordance with some embodiments;

FIG. 4B illustrates a style sheet for an e-mail message, in accordance with some embodiments;

FIG. 5A illustrates source code of an e-mail message, in accordance with some embodiments;

FIG. 5B illustrates a style sheet for an e-mail message, in accordance with some embodiments;

DETAILED DESCRIPTION

Figure 1:
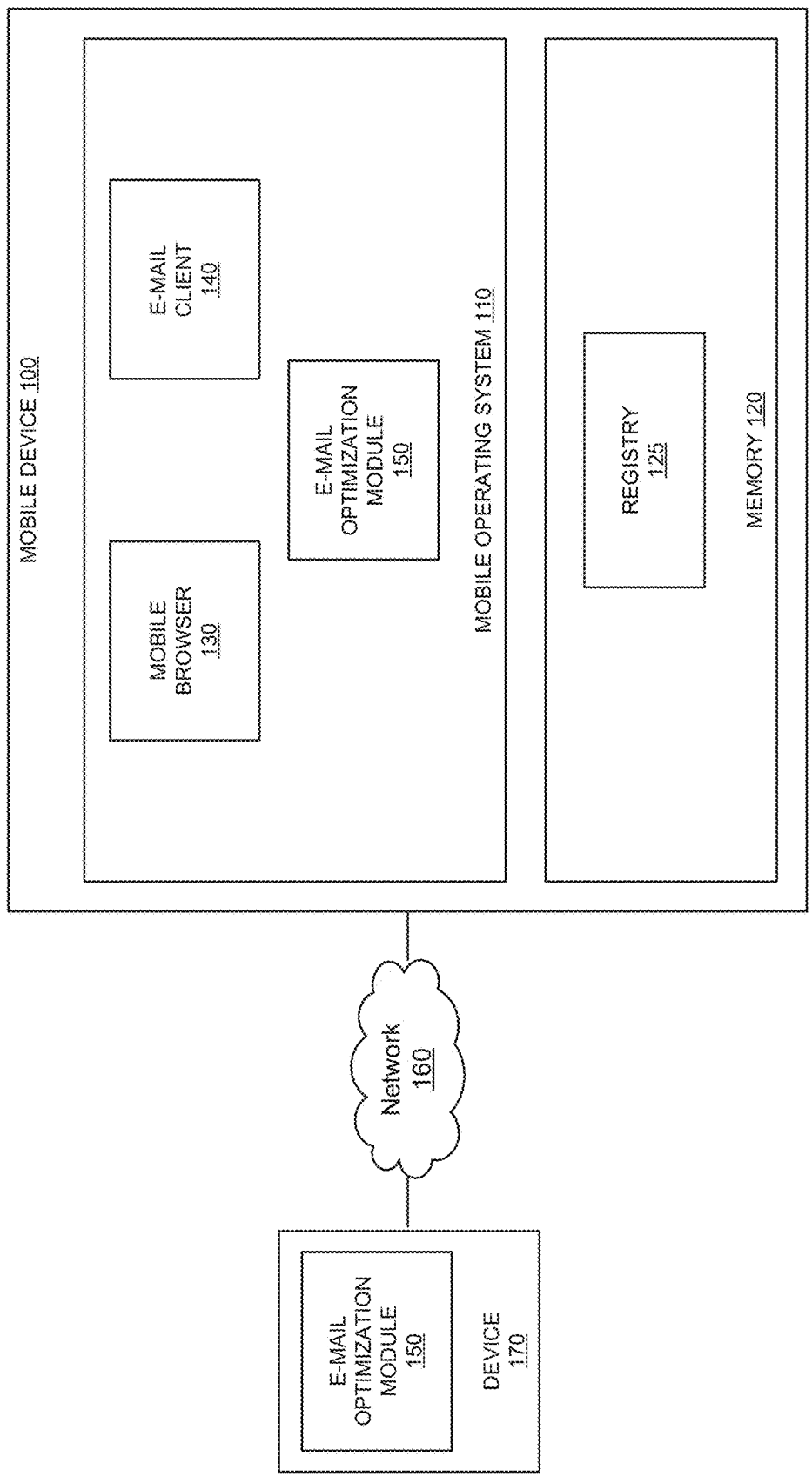
FIG. 1 is a block diagram illustrating various functional components of a mobile computing environment, in accordance with some embodiments.

Example methods and systems of optimizing e-mail for mobile devices are described. In the following description, for purposes of explanation, numerous specific details are set forth in order to provide a thorough understanding of example embodiments. It will be evident, however, to one skilled in the art that the present embodiments may be practiced without these specific details.

In some embodiments, a method comprises causing an e-mail message to be displayed within an e-mail client on a mobile device. The e-mail message comprises a selectable link corresponding to a website action that can be performed on a website. The action can affect content of the website. A user on the mobile device is enabled to cause a performance of an e-mail action corresponding to the website action via the e-mail client without navigating to the website.

In some embodiments, the e-mail message comprises a non-mobile link configured to cause a performance of the website action on the website via a navigation to the website. A mobile link configured to cause the performance of the e-mail action via the e-mail client can be included in the e-mail message. A Cascading Style Sheets (CSS) pseudo-element can be included in CSS rules for the e-mail message. The CSS pseudo-element can be configured to generate mobile content associated with the mobile link. In some embodiments, the CSS pseudo-element comprises an :after selector or a :before selector. In some embodiments, the non-mobile link comprises a desktop link. In some embodiments a first CSS attribute selector is included in the non-mobile link and a second CSS attribute selector is included in the mobile link. In some embodiments, at least one CSS attribute selector is included in the CSS rules for the e-mail message.

In some embodiments, a new e-mail message is generated within the e-mail client in response to the user selection of the selectable link. The new e-mail message can comprise action content corresponding to a performance of the website action on the website.

In some embodiments, the mobile device comprises one of a smart phone, a tablet computer, and a wearable computing device. In some embodiments, the website comprises a social network website.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

In the following description, for purposes of explanation, numerous specific details are set forth in order to provide a thorough understanding of the various aspects of different embodiments of the present disclosure. It will be evident, however, to one skilled in the art, that the subject matter of the present disclosure may be practiced without all of the specific details.

As described herein, a mobile operating system provided by a mobile device may provide various resources, such as mobile browsers, mobile applications, widgets and so on, and may navigate users between the resources, and otherwise within the mobile operating system, in a variety of ways. FIG. 1 is a block diagram illustrating various functional components of a mobile computing environment, consistent with some embodiments.

The mobile computing environment may be provided and/or supported by various hardware, such as a mobile device 100 that includes a processor configured to process and execute instructions presented by resources located within a mobile operating system 110 and/or instructions stored in memory 120 of the mobile device 100. Example mobile devices include tablet computers, mobile phones (e.g., smart phones), personal digital assistants, personal audio or video players, global positioning devices, laptop computers, digital cameras, mobile gaming devices, wearable computing devices, and/or other devices or machines capable of supporting a mobile operating system, including mobile applications and other resources, and executing instructions (sequential or otherwise) that specify actions to be taken by the devices.

As shown in FIG. 1, the mobile operating system 110 includes various computing resources, such as a mobile browser 130 and an e-mail client 140 (e.g., a mobile application for an email account associated with a user of the mobile device 100). The mobile operating system 110 can facilitate the navigation between these and other resources by utilizing various configuration settings and options stored within a registry 125 of the memory 120, or other databases (not shown) within the memory 120, such as databases that store preferences or other configuration information. Other techniques of facilitating navigation between resources are also within the scope of the present disclosure.

An e-mail optimization module 150 may be employed to enable a user on the mobile device 100 to cause a performance of an action for a website via the e-mail client 140 without navigating to the website. In some embodiments, the e-mail optimization module 150 resides on the mobile device 100. For example, the e-mail optimization module 150 may be implemented as a plug-in for the mobile browser 130 or the e-mail client 140. In another example, the e-mail optimization module 150 may be integrated into or otherwise part of the mobile browser 130 or the e-mail client 140. In some embodiments, the e-mail optimization module 150 resides on a device 170 other than the mobile device 100. This other device 170 may communicate with the mobile device via a network 160. The network 160 may be any network that enables communication between or among machines, databases, and devices. Accordingly, the network 160 may be a wired network, a wireless network (e.g., a mobile or cellular network), or any suitable combination thereof. The network 160 may include one or more portions that constitute a private network, a public network (e.g., the Internet), or any suitable combination thereof. Other implementations of the e-mail optimization module 150 are also within the scope of the present disclosure.

The e-mail optimization module 150 makes it possible for a user on the mobile device 100 to use a selectable link that is associated with a performance of an action on a website to cause the performance of a corresponding action via the e-mail client 140 without the mobile device 100 having to navigate to the website. The selectable link can be included in content being displayed on the mobile device 100, such as an e-mail message being viewed within the e-mail client 140 or a page being viewed within the mobile browser 130, the e-mail client 140, or a mobile application (not shown).

This type of selectable link can be included in the content in a variety of ways. In some embodiments, the e-mail optimization module 150 can receive the content (e.g., an e-mail message) and either insert this selectable link into the content or modify an already existing selectable link within the content to be configured to perform the corresponding action via the e-mail client 140, thereby transforming an already existing selectable link into an optimized selectable link.

It is contemplated that the operations of the e-mail optimization module 150 may be performed at various stages of the flow of the content from its source to its display on the mobile device 100. In some embodiments, the e-mail optimization module 150 may be employed by a social network website (e.g., a LinkedIn® or Facebook®), or by some other website or online service, on the other device 170 to insert or modify a selectable link in content (e.g., an e-mail message) before providing that content to the mobile device 100 (e.g., before sending the e-mail message to an e-mail account of the user of the mobile device 100 or before causing the message to be displayed on the mobile device 100). In some embodiments, the e-mail optimization module 150 may be employed by the mobile device 100 to insert or modify a selectable link in content (e.g., an e-mail message) after the content has been received by the mobile device 100. Other implementations are also within the scope of the present disclosure.

Figure 2A:
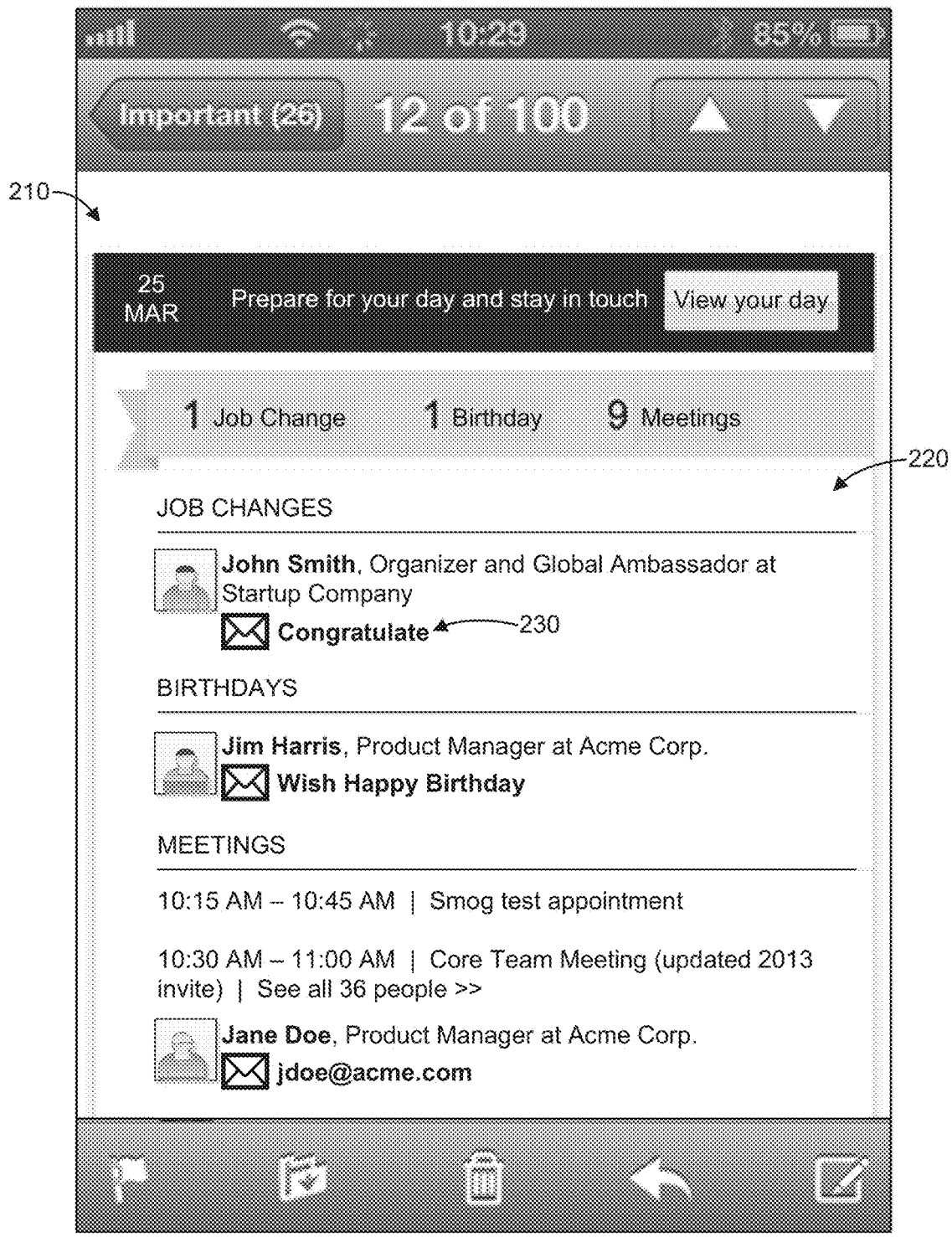
FIG. 2A illustrates an e-mail message comprising a selectable link corresponding to an action that can be performed on a website being displayed within an e-mail client on a mobile device, in accordance with some embodiments.

FIG. 2A illustrates an e-mail message 210 comprising a selectable link 230 being displayed within an e-mail client 140 on a mobile device 100, in accordance with some embodiments. The selectable link 230 is included in content 220 of the e-mail message 210. In FIG. 2A, the content 220 comprises a timeline or feed of a social network service for the user of the mobile device 100, who may be a member of that social network service. Here, the content includes various content items regarding job changes and birthdays of other members of the social network service, as well as content items regarding upcoming meetings. The selectable link 230 is configured to enable the user to congratulate another member (John Smith) of the social network service on a job change.

In some embodiments, the selection of the selectable link 230 may cause the performance of a website action that can be performed on the website of the social network service. For example, in response to the user selecting the selectable link 230 in FIG. 2A, the mobile browser 130 may be launched on mobile device 100 with the website of the social network service being displayed to the user via the mobile browser 130. At the website within the mobile browser 130, the user may be provided or prompted with instructions or tools that enable the user to engage in the performance of the website action, such as a window having input fields for the user provide information for congratulating the other member on his job change, as well as user interface elements (e.g., a "Send" or "Submit" button) to enable the user to trigger the completion of the website action.

Figure 2B:
FIG. 2B illustrates a new e-mail message comprising action content corresponding to a performance of the action on the website being displayed within the e-mail client on the mobile device, in accordance with some embodiments.

While the performance of the website action via navigation to the website may be desired in some situations, such as when the user is using a desktop computer, performance of a corresponding e-mail action via the e-mail client 140 without having to navigate to the website may be desired in other situations, such as when the user is using a mobile device (e.g., mobile device 100). In some embodiments, the selectable link 230 is configured to generate a new e-mail message within the e-mail client 140 in response to the user selection of the selectable link 230. FIG. 2B illustrates a new e-mail message 240 comprising action content corresponding to a performance of the action on the website being displayed within the e-mail client 140 on the mobile device 100, in accordance with some embodiments. In the example shown in FIG. 2B, the action content includes pre-selected content inserted into different fields of the new e-mail message 240, such as recipient field information 242 (e.g., "nik@partender.com"), subject field information 244 (e.g., "Congrats"), and body field information 246 (e.g., "Hi Nikhil, Congrats on the new gig! Hope you're . . . "). In some embodiments, the user may modify the action content within the new e-mail message 240, such as by adding or removing body field information 246.

These features of the selectable link 230 can be implemented on a web page by including two links (e.g., two "Congratulate" links) in the HyperText Markup Language (HTML) of the web page, hiding both links with the CSS display property "CSS: display:none", and using JavaScript to show the correct link on the correct platform. However, implementing these features of the selectable link 230 in an e-mail message is much more complicated and challenging. Only certain mobile devices, e-mail clients, and e-mail service providers support the CSS display property "CSS: display:none". As a result, including two "Congratulate" links in the HTML of the e-mail message would often result in two "Congratulate" links being displayed to the user, which is an inefficient and inelegant approach. Additionally, JavaScript is not available in e-mail clients. However, the present disclosure provides a solution to these issues with implementing the selectable link 230 in an e-mail message, as will be discussed in further detail below.

FIG. 3A illustrates source code 310 of an e-mail message 210, in accordance with some embodiments. In some embodiments, the source code 310 comprises a code snippet 312 for a non-mobile link configured to cause a performance of a website action on the website via a navigation to the website. As shown in FIG. 3A, the code snippet 312 can include link content 314 (e.g., "Congratulate") that is to displayed by the e-mail message 210 as a selectable link 230 to a web page located at: http://www.linkedin.com/contacts/email/redirect/?id=5745436&profile_id=23510&type=&url=http%3A%2F%2Fwww.linkedin.com%2Fcontacts%2Fdaily%2F%3Ftype%3Djob_change%26id%3D52697228, which can be selected by the user to cause or initiate the performance of the website action via navigation to the website, such as within mobile browser 130.

In some embodiments, the source code 310 of the e-mail message 210 also comprises a code snippet 316 for a mobile link configured to cause a performance of an e-mail action corresponding to the website action via the e-mail client 140. The code snippet 316 can include a link, such as: href="mailto:nik@partender.com?subject=Congrats&body=Hi%20Nikhil%2C%0A%0ACongrats%20on%20the%20new%20gig!%20Hope%20you%27re%20doing%20well.%0A%0ARahul" class="mobile", which, when selected, causes the generation a new email message (e.g., new e-mail message 240) via the e-mail client 140. As shown in FIG. 3A, the code snippet 316 may include a blank space 318 or simply no link content in the portion of the code snippet 316 where corresponding link content (e.g., content that is to be displayed by the e-mail message 210 as a selectable link to a web page) would be normally be placed.

Accordingly, the source code 310 can include code snippet 312 associated with enabling a non-mobile link when the e-mail message 210 is displayed using a non-mobile device (e.g., via a desktop browser on a desktop computer), and a code snippet 316 associated with enabling a mobile link when the e-mail message 210 is displayed using a mobile device (e.g., mobile device 100).

In some embodiments, the mobile link associated with the code snippet 316 may not be displayed in the e-mail client 140, since there is a blank space 318 or simply no link content in the portion of the code snippet 316 where corresponding link content would be normally be placed. This lack of display of the mobile link can be addressed by including a CSS pseudo-element in CSS rules for the e-mail message 210. The CSS pseudo-element can be configured to generate mobile link content associated with the mobile link. In some embodiments, the CSS pseudo-element comprises an :after selector or a :before selector.

FIG. 3B illustrates a style sheet 350 comprising CSS rules for an e-mail message 210, in accordance with some embodiments. The style sheet 350 can includes a code snippet 352 that targets the rules to mobile rendering environments, a code snippet 354 that makes the mobile link visible, a code snippet 356 that generates the mobile link text, and a code snippet 358 hides or prevents the display of the non-mobile link. As described herein, the code snippet 356 includes a selector function, such as the ":after" selector, which enables the CSS 350 to insert the content of "Congratulate" into the e-mail message 210 in association with the mobile link. Of course, the code snippet 356 may include other selector functions, such as the ":before" selector, and/or other functions that facilitate the insertion of mobile link text or content at targeted locations within the e-mail message 210.

Certain e-mail clients and e-mail service providers (e.g., Yahoo! Mail) do not respect "@media" query restrictions, thereby resulting in broken layouts when they attempt to process the mobile styles discussed above. However, the present disclosure offers a solution to this problem. In some embodiments, CSS attribute selectors are used, since the e-mail clients and e-mail service providers that do not respect "@media" query restrictions will drop any CSS rule that includes CSS attribute selectors. FIG. 4A illustrates source code 410 of an e-mail message 210, in accordance with some embodiments. FIG. 4A illustrates an alternate version 410 of source code 310 of FIG. 3A, where the code snippet 312 for the non-mobile link and the code snippet 316 for the mobile link both include CSS attribute selectors 412 (e.g., yahoofix="true") and 414 (e.g., yahoofix="true"), respectively.

Additionally, in some embodiments, one or more CSS attribute selectors may be included in the CSS rules for the e-mail message. FIG. 4B illustrates an alternate version 450 of style sheet 350, where the various code snippets 354, 356, and 358 each include corresponding CSS attribute selectors 454, 456, and 458 (e.g., yahoofix="true"). Here, by adding the attribute selectors to the source code 410 and the style sheets 450, the e-mail optimization module 150 enables certain e-mail clients and e-mail service providers that do not correctly process the @media rule to ignore the rule.

In some embodiments, techniques may be employed that enable a one-click action within an e-mail message. For example, in an e-mail message that informs a user about a friend's status update, the user could select a link within the e-mail message to "like" it (or perform some other social network service operation) without the user leaving the e-mail client. FIG. 5A illustrates source code 510 of an e-mail message that can enable this one-click action within the e-mail message, in accordance with some embodiments. FIG. 5B illustrates a style sheet 550 for an e-mail message that can enable the one-click action within the e-mail message, in accordance with some embodiments. In the examples of FIG. 5A-5B, when the user loads the e-mail message, a link that says "like" can be presented within the e-mail message to the user. When the user selects the link, it can change to some text saying "you like this" or some other text. Additionally, when the user selects the link, the e-mail client can download an image (e.g., like.gif) from a server. The server can detect the fact that the image was downloaded, and can use it not only to serve the image to the e-mail client, but also to trigger the fact that the user likes this particular status update. The token in the image URL can identify the particular status update, and can also identify the user performing the "like".

Figure 6:
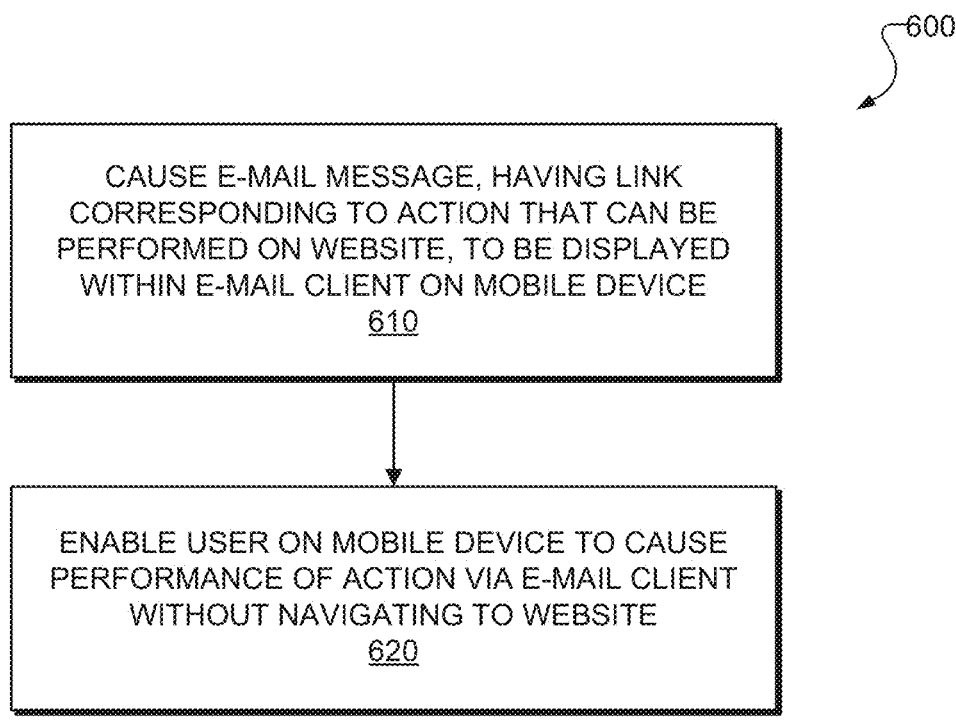
FIG. 6 is a flow diagram illustrating a method of optimizing e-mail for a mobile device, in accordance with some embodiments.

FIG. 6 is a flow diagram illustrating a method 500 of optimizing e-mail for a mobile device, in accordance with some embodiments. It is contemplated that the operations of method 600 may be performed by a system or modules of a system (e.g., e-mail optimization module 150 in FIG. 1). It will be appreciated that the method 600 may be performed on any suitable hardware. Although operations are described herein as being performed by the email optimization module 150, it is contemplated that other systems, engines, and/or modules may perform these operations as well. At operation 610, an e-mail message 210 is caused to be displayed within an e-mail client 140 on a mobile device 100. The e-mail message 210 may comprise a selectable link 230 corresponding to an action that can be performed on a website. The action can affect content of the website. At operation 620, a user on the mobile device 100 is enabled to cause a performance of the action via the e-mail client 140 without navigating to the website. In some embodiments, the mobile device 100 comprises one of a smart phone, a tablet computer, and a wearable computing device. In some embodiments, the website comprises a social network website. It is contemplated that the operations of method 600 may incorporate any of the other features disclosed herein.

Figure 7:
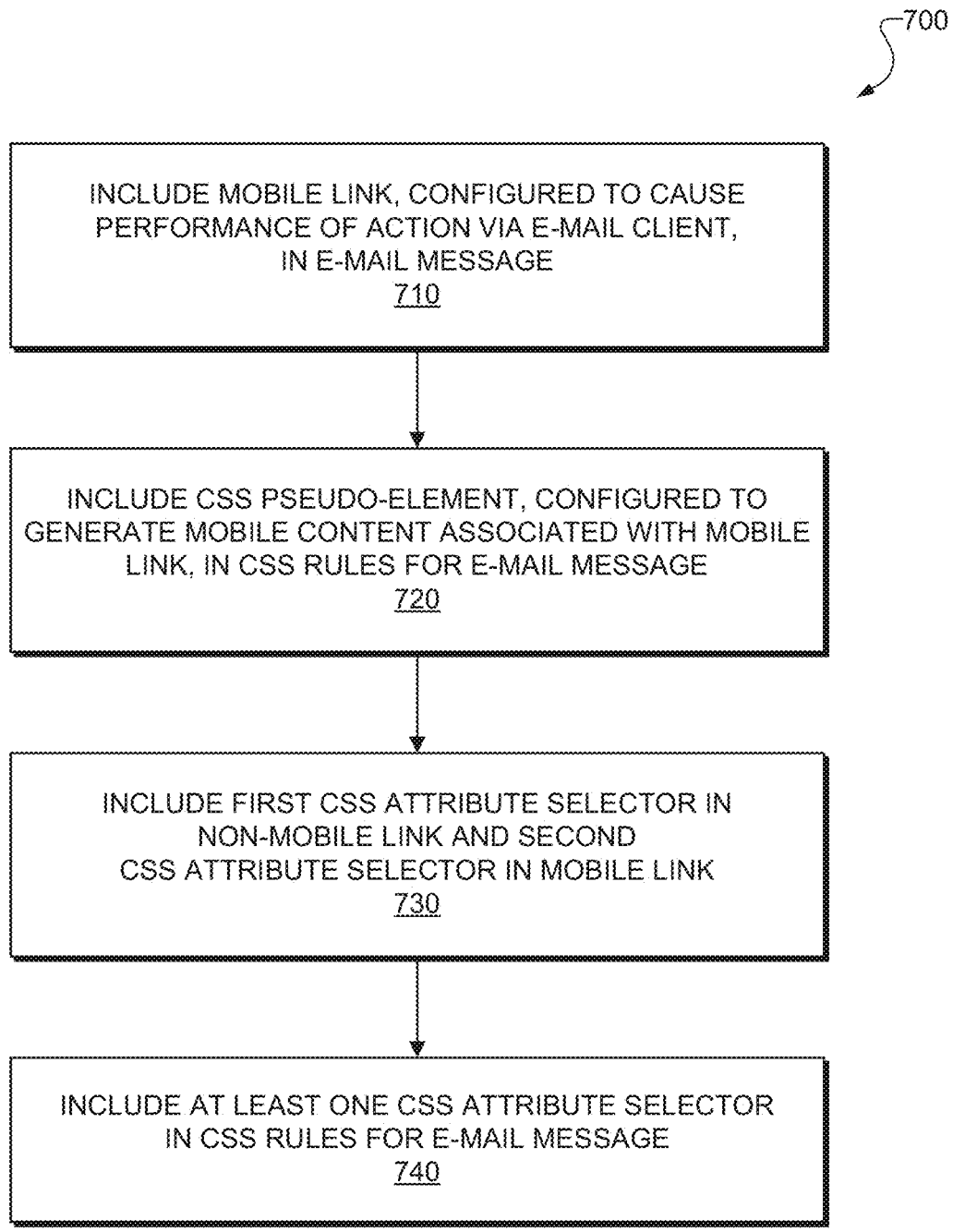
FIG. 7 is a flow diagram illustrating a method of enabling a user on a mobile device to cause a performance of an action via an e-mail client without navigating to a website, in accordance with some embodiments.

FIG. 7 is a flow diagram illustrating a method 700 of enabling a user on a mobile device to cause a performance of an action via an e-mail client without navigating to a website, in accordance with some embodiments. It is contemplated that the operations of method 700 may be performed by a system or modules of a system (e.g., e-mail optimization module 150 in FIG. 1). It will be appreciated that the method 700 may be performed on any suitable hardware. Although operations are described herein as being performed by the e-mail optimization module 150, it is contemplated that other systems, engines, and/or modules may perform these operations as well.

At operation 710, a mobile link 316 configured to cause the performance of an action via an e-mail client 140 can be included in an e-mail message 210. In some embodiments, the e-mail message 210 comprises a non-mobile link 312 configured to cause a performance of the action on a website via a navigation to the website. In some embodiments, the non-mobile link 312 comprises a desktop link. Operation 710 may employ the techniques and configurations previously discussed with respect to FIG. 3A. However, it is contemplated that other techniques and configurations are also within the scope of the present disclosure.

At operation 720, a CSS pseudo-element 356 is included in CSS rules 350 for the e-mail message 210. The CSS pseudo-element 356 can be configured to generate mobile content associated with the mobile link 316. In some embodiments, the CSS pseudo-element 356 comprises an :after selector or a :before selector. Operation 720 may employ the techniques and configurations previously discussed with respect to FIG. 3B. However, it is contemplated that other techniques and configurations are also within the scope of the present disclosure At operation 730, a first CSS attribute selector 412 is included in the non-mobile link 312 and a second CSS attribute selector 414 is included in the mobile link 316. Operation 730 may employ the techniques and configurations previously discussed with respect to FIG. 4A. However, it is contemplated that other techniques and configurations are also within the scope of the present disclosure.

At operation 740, at least one CSS attribute selector 452 is included in the CSS rules 450 for the e-mail message 210. Operation 740 may employ the techniques and configurations previously discussed with respect to FIG. 4B. However, it is contemplated that other techniques and configurations are also within the scope of the present disclosure.

In some embodiments, any combination of one or more of the operations 710, 720, 730, and 740 can be performed by an e-mail optimization module 150 residing on the mobile device 100, as previously discussed. In some embodiments, any combination of one or more of the operations 710, 720, 730, and 740 can be performed by an e-mail optimization module 150 residing on the other device 170, as previously discussed. In some embodiments, some of the operations 710, 720, 730, and 740 can be performed by an e-mail optimization module 150 residing on the mobile device 100, while the other operations can be performed by an e-mail optimization module 150 residing on the other device 170. It is contemplated that the operations of method 700 may incorporate any of the other features disclosed herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, engines, objects or devices that operate to perform one or more operations or functions. The modules, engines, objects and devices referred to herein may, in some example embodiments, comprise processor-implemented modules, engines, objects and/or devices.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Example Mobile Device

Figure 8:
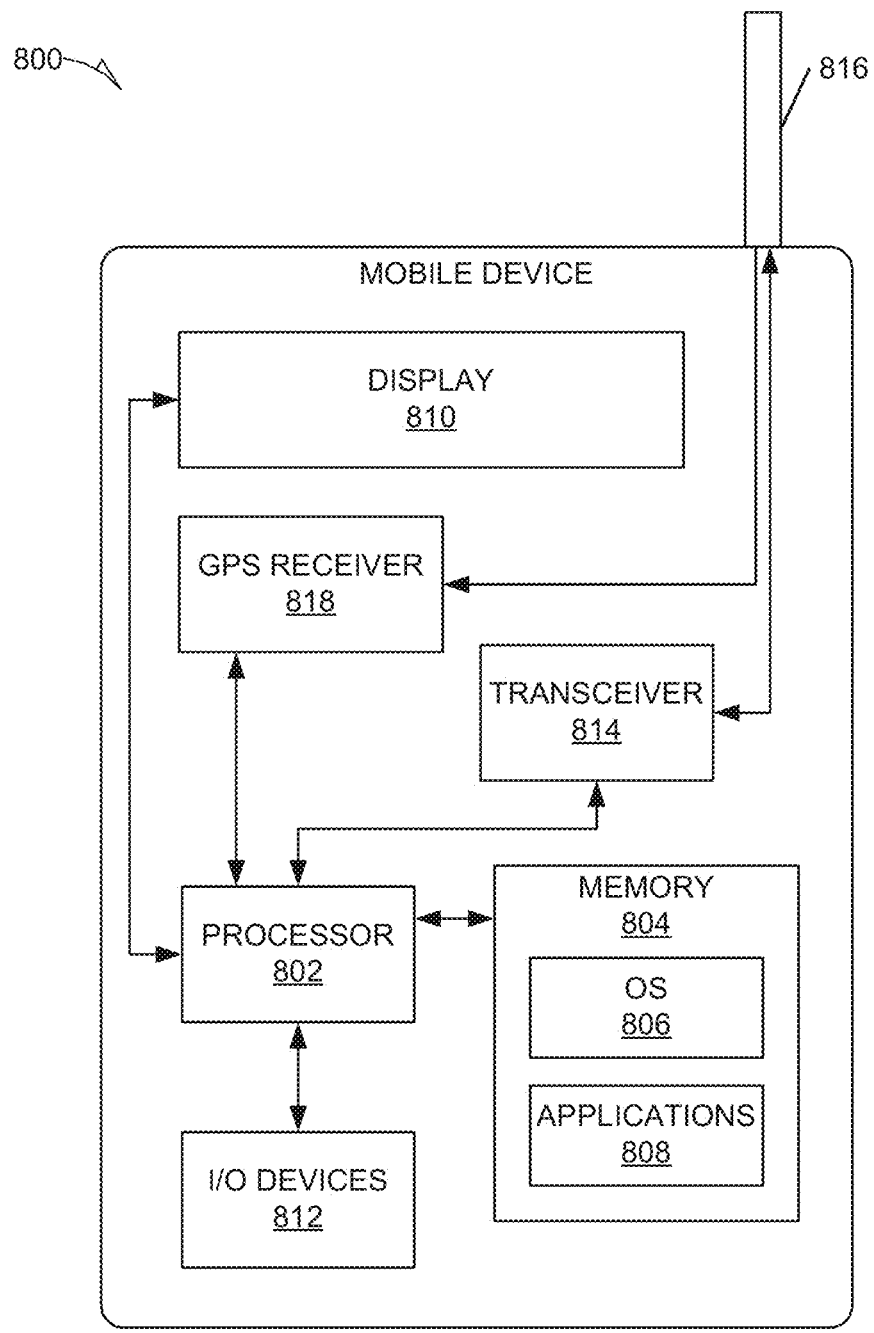
FIG. 8 is a block diagram illustrating a mobile device, in accordance with some embodiments.

FIG. 8 is a block diagram illustrating a mobile device 800, according to an example embodiment. The mobile device 800 may include a processor 802. The processor 802 may be any of a variety of different types of commercially available processors 802 suitable for mobile devices 800 (for example, an XScale architecture microprocessor, a microprocessor without interlocked pipeline stages (MIPS) architecture processor, or another type of processor 802). A memory 804, such as a random access memory (RAM), a flash memory, or other type of memory, is typically accessible to the processor 802. The memory 804 may be adapted to store an operating system (OS) 806, as well as application programs 808, such as a mobile location enabled application that may provide LBSs to a user. The processor 802 may be coupled, either directly or via appropriate intermediary hardware, to a display 810 and to one or more input/output (I/O) devices 812, such as a keypad, a touch panel sensor, a microphone, and the like. Similarly, in some embodiments, the processor 802 may be coupled to a transceiver 814 that interfaces with an antenna 816. The transceiver 814 may be configured to both transmit and receive cellular network signals, wireless data signals, or other types of signals via the antenna 816, depending on the nature of the mobile device 800. Further, in some configurations, a GPS receiver 818 may also make use of the antenna 816 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
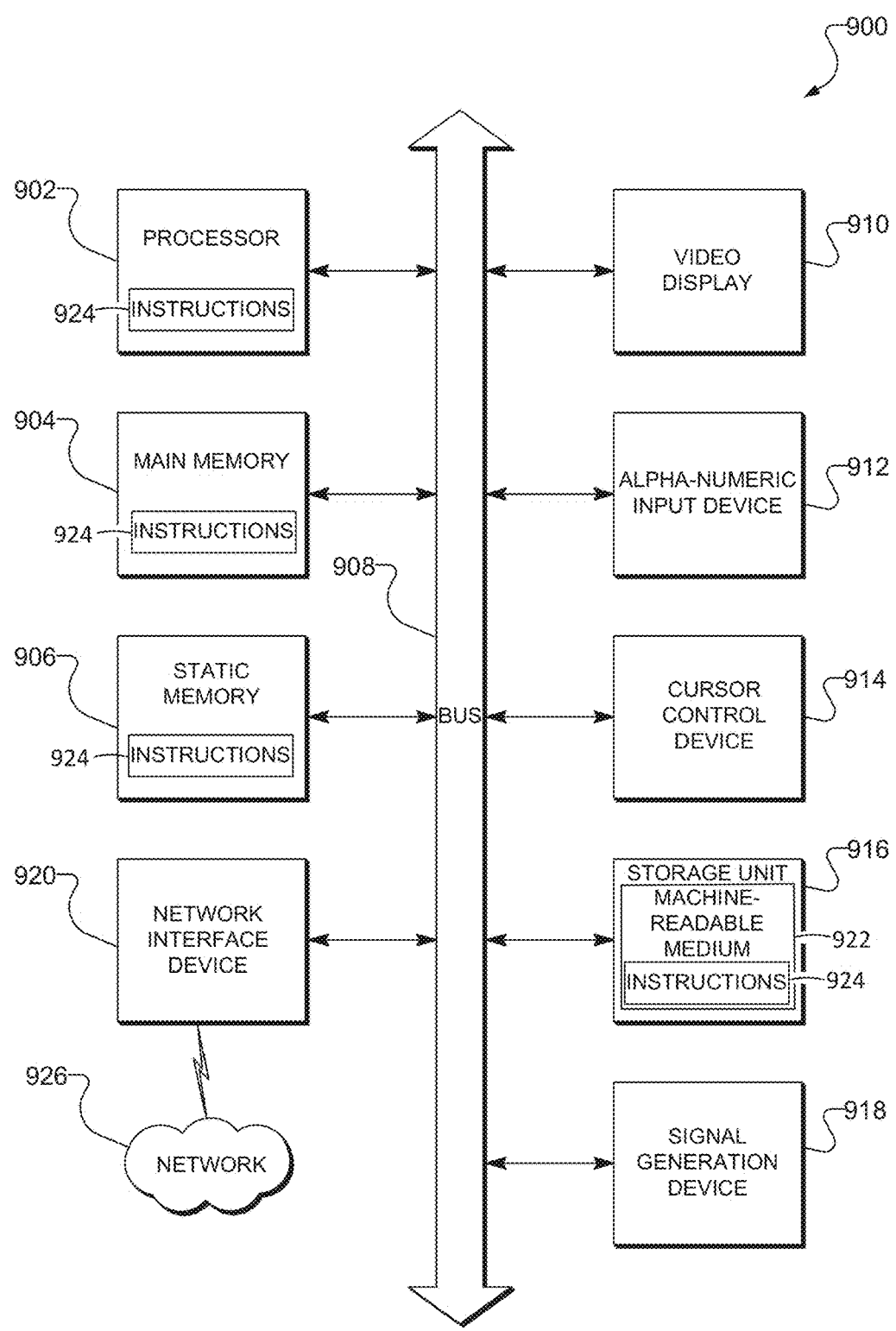
FIG. 9 is a block diagram of an example computer system on which methodologies described herein may be executed, in accordance with some embodiments.

FIG. 9 is a block diagram of an example computer system 900 on which methodologies described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

causing an initial e-mail message to be displayed within an e-mail client on a mobile device, the initial e-mail message comprising a selectable link corresponding to a website action that can be performed on a social network website, the website action comprising a social network service operation that affects content of the social network website; and configuring, by a machine having a memory and at least one processor, the selectable link to cause a performance of an e-mail action corresponding to the website action via the e-mail client without navigating to the social network website based on a user selection of the selectable link within the e-mail client, the selectable link being configured to generate a new e-mail message within the e-mail client in response to the user selection of the selectable link, the new e-mail message comprising action content corresponding to the performance of the website action on the social network website, the generating of the new e-mail message comprising inserting pre-selected text into a body field of the new e-mail message, the pre-selected text having been defined and included in source code of the initial e-mail message, the source code comprising one or more instructions in a computer programming language.

2. The method of claim 1, wherein the initial e-mail message comprises a non-mobile link configured to cause a performance of the website action on the social network website via a navigation to the social network website, and the method further comprises:

including a mobile link in the initial e-mail message, the mobile link being configured to cause the performance of the e-mail action via the e-mail client; and including a Cascading Style Sheets (CSS) pseudo-element in CSS rules for the initial e-mail message, the CSS pseudo-element being configured to generate mobile content associated with the mobile link.

3. The method of claim 2, wherein the CSS pseudo-element comprises an :after selector or a :before selector.

4. The method of claim 2, wherein the non-mobile link comprises a desktop link.

5. The method of claim 2, further comprising including a first CSS attribute selector in the non-mobile link and a second CSS attribute selector in the mobile link.

6. The method of claim 2, further comprising including at least one CSS attribute selector in the CSS rules for the initial e-mail message.

7. The method of claim 1, wherein the mobile device comprises one of a smart phone, a tablet computer, and a wearable computing device.

8. A system comprising:

a memory;

at least one processor coupled to the memory; and an e-mail optimization module, executable by the at least one processor, configured to:

cause an initial e-mail message to be displayed within an e-mail client on a mobile device, the initial e-mail message comprising a selectable link corresponding to a website action that can be performed on a social network website, the website action comprising a social network service operation that affects content of the social network website; and configure the selectable link to cause a performance of an e-mail action corresponding to the website action via the e-mail client without navigating to the social network website based on a user selection of the selectable link within the e-mail client, the selectable link being configured to generate a new e-mail message within the e-mail client in response to the user selection of the selectable link, the new e-mail message comprising action content corresponding to the performance of the website action on the social network website, the generating of the new e-mail message comprising inserting pre-selected text into a body field of the new e-mail message, the pre-selected text having been defined in source code of the initial e-mail message, the pre-selected text having been included in the source code of the initial e-mail message, the source code comprising one or more instructions in a computer programming language.

9. The system of claim 8, wherein the initial e-mail message comprises a non-mobile link configured to cause a performance of the website action on the social network website via a navigation to the social network website, and the e-mail optimization module is further configured to:

include a mobile link in the initial e-mail message, the mobile link being configured to cause the performance of the e-mail action via the e-mail client; and include a CSS pseudo-element in CSS rules for the initial e-mail message, the CSS pseudo-element being configured to generate mobile content associated with the mobile link.

10. The system of claim 9, wherein the CSS pseudo-element comprises an :after selector or a :before selector.

11. The system of claim 9, wherein the non-mobile link comprises a desktop link.

12. The system of claim 9, wherein the e-mail optimization module is further configured to include a first CSS attribute selector in the non-mobile link and a second CSS attribute selector in the mobile link.

13. The system of claim 9, wherein the e-mail optimization module is further configured to include at least one CSS attribute selector in the CSS rules for the initial e-mail message.

14. The system of claim 8, wherein the mobile device comprises one of a smart phone, a tablet computer, and a wearable computing device.

15. A non-transitory machine-readable medium embodying a set of instructions that, when executed by a processor, cause the processor to perform operations, the operations comprising:

causing an initial e-mail message to be displayed within an e-mail client on a mobile device, the initial e-mail message comprising a selectable link corresponding to a website action that can be performed on a social network website, the website action comprising a social network service operation that affects content of the social network website; and configuring the selectable link to cause a performance of an e-mail action corresponding to the website action via the e-mail client without navigating to the social network website based on a user selection of the selectable link within the e-mail client, the selectable link being configured to generate a new e-mail message within the e-mail client in response to the user selection of the selectable link, the new e-mail message comprising action content corresponding to the performance of the website action on the social network website, the generating of the new e-mail message comprising inserting pre-selected text into a body field of the new e-mail message, the pre-selected text having been defined in source code of the initial e-mail message, the pre-selected text having been included in the source code of the initial e-mail message, the source code comprising one or more instructions in a computer programming language.

16. The non-transitory machine-readable medium of claim 15, wherein the initial e-mail message comprises a non-mobile link configured to cause a performance of the website action on the social network website via a navigation to the website, and the operations further comprise:
- including a mobile link in the initial e-mail message, the mobile link being configured to cause the performance of the e-mail action via the e-mail client;
- including a CSS pseudo-element in CSS rules for the initial e-mail message, the CSS pseudo-element being configured to generate mobile content associated with the mobile link;
- including a first CSS attribute selector in the non-mobile link;
- including a second CSS attribute selector in the mobile link; and
- including at least one CSS attribute selector in the CSS rules for the initial e-mail message.

* * * * *